Figure 2A:
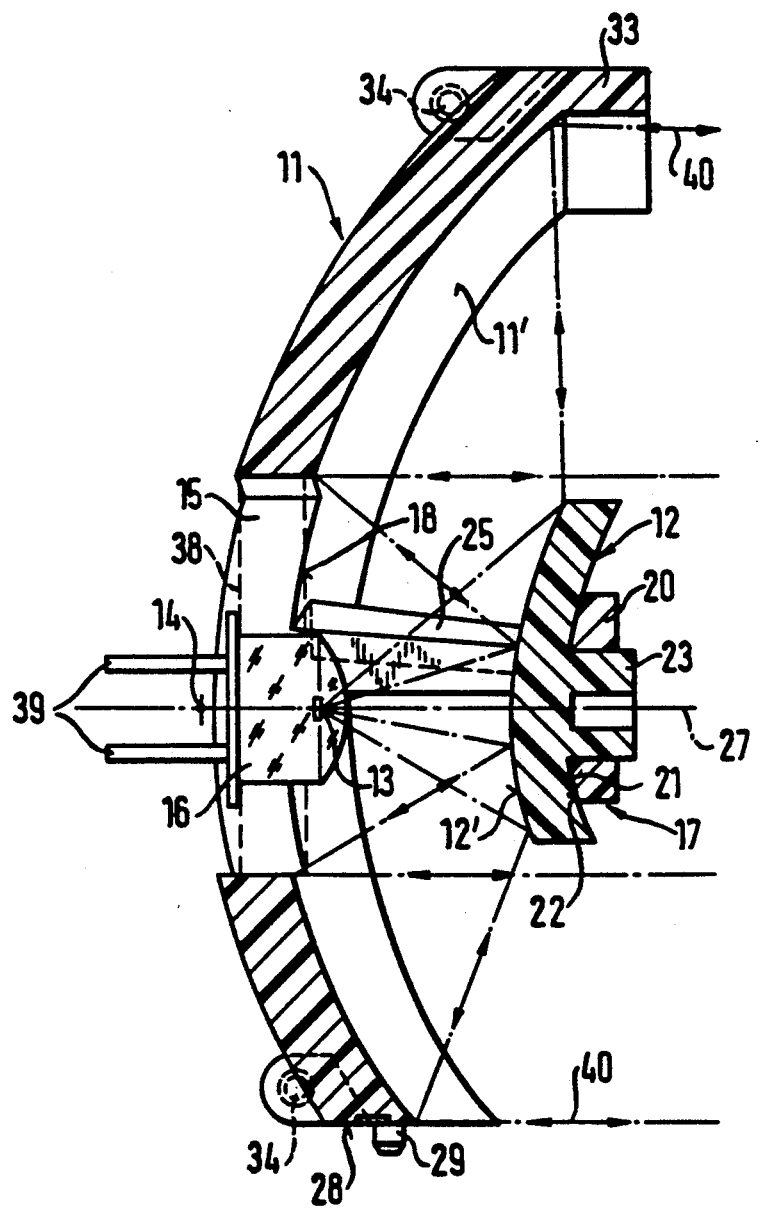

United States Patent

Dreher et al.

[11] Patent Number: 5,298,736
[45] Date of Patent: Mar. 29, 1994

[54] MIRROR COLLIMATOR HAVING A LARGE APERTURE RATIO

[75] Inventors: Hubertus Dreher, Elzach; Otmar Karle, Vörstetten; Hans-Thomas Meinert, Emmendingen, all of Fed. Rep. of Germany

[73] Assignee: Erwin Sick GmbH, Waldkirch, Fed. Rep. of Germany

[21] Appl. No.: 909,943

[22] Filed: Jul. 7, 1992

[30] Foreign Application Priority Data

Jul. 9, 1991 [DE] Fed. Rep. of Germany ....... 4122696

[51] Int. Cl.$^5$ ................................. H01J 3/14
[52] U.S. Cl. ....................... 250/216; 359/859
[58] Field of Search ................ 250/216, 239; 359/857, 359/858, 859

[56] References Cited

U.S. PATENT DOCUMENTS 3,817,605 6/1974 Franklin .
4,695,139 9/1987 Bagby et al. ................. 359/859
4,792,685 12/1988 Yamakawa .

FOREIGN PATENT DOCUMENTS

3504366A1 8/1985 Fed. Rep. of Germany .
3527826A1 3/1987 Fed. Rep. of Germany .
4108137A1 9/1991 Fed. Rep. of Germany .

Primary Examiner—David C. Nelms
Assistant Examiner—K. Shami
Attorney, Agent, or Firm—Townsend and Townsend Khourie and Crew

[57] ABSTRACT

A mirror collimator has a larger parabolic mirror (11) and a smaller convexly shaped capture mirror (12) arranged at the concave side of the parabolic mirror and on its optical axis (27). A cut-out 15 is formed at the common focal point of the parabolic mirror (11) and of the capture mirror (12) and a photo-element (16) is arranged in the area of this cut-out (15). The capture mirror (12) is secured to the parabolic mirror (11) by at least one carrying device (17) extending alongside the cut-out (15).

21 Claims, 4 Drawing Sheets

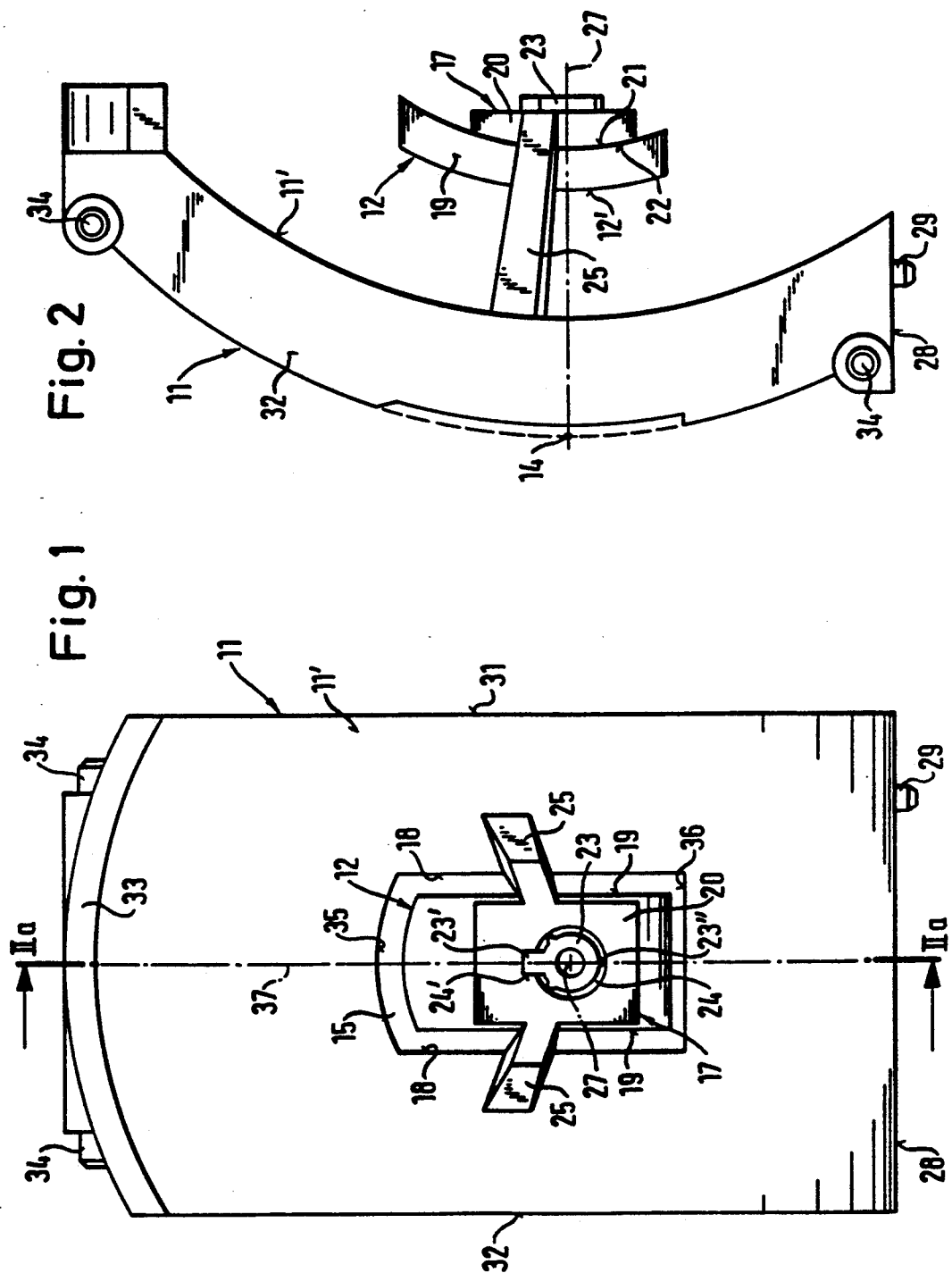

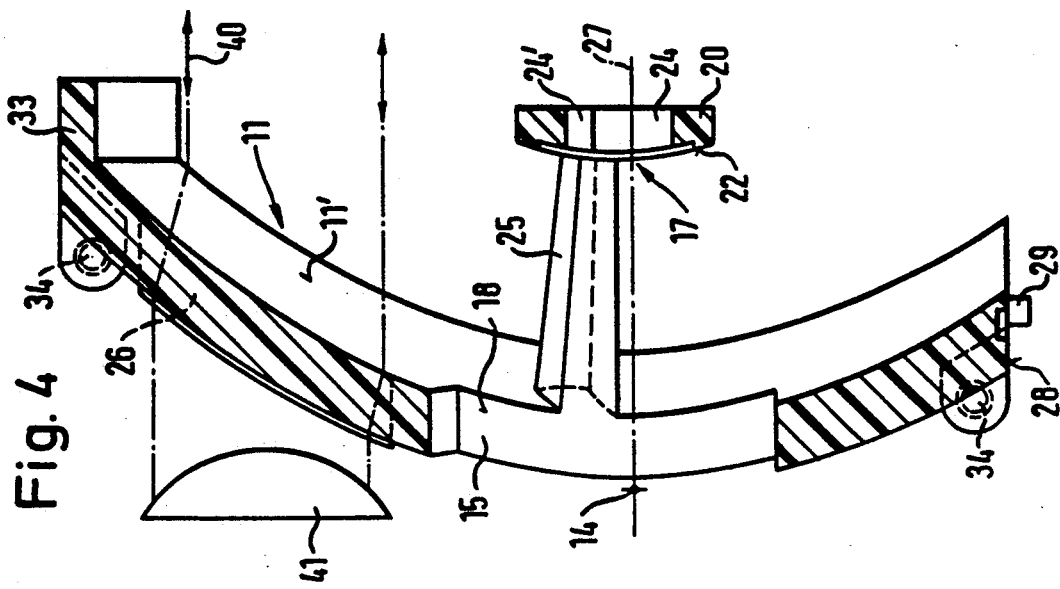
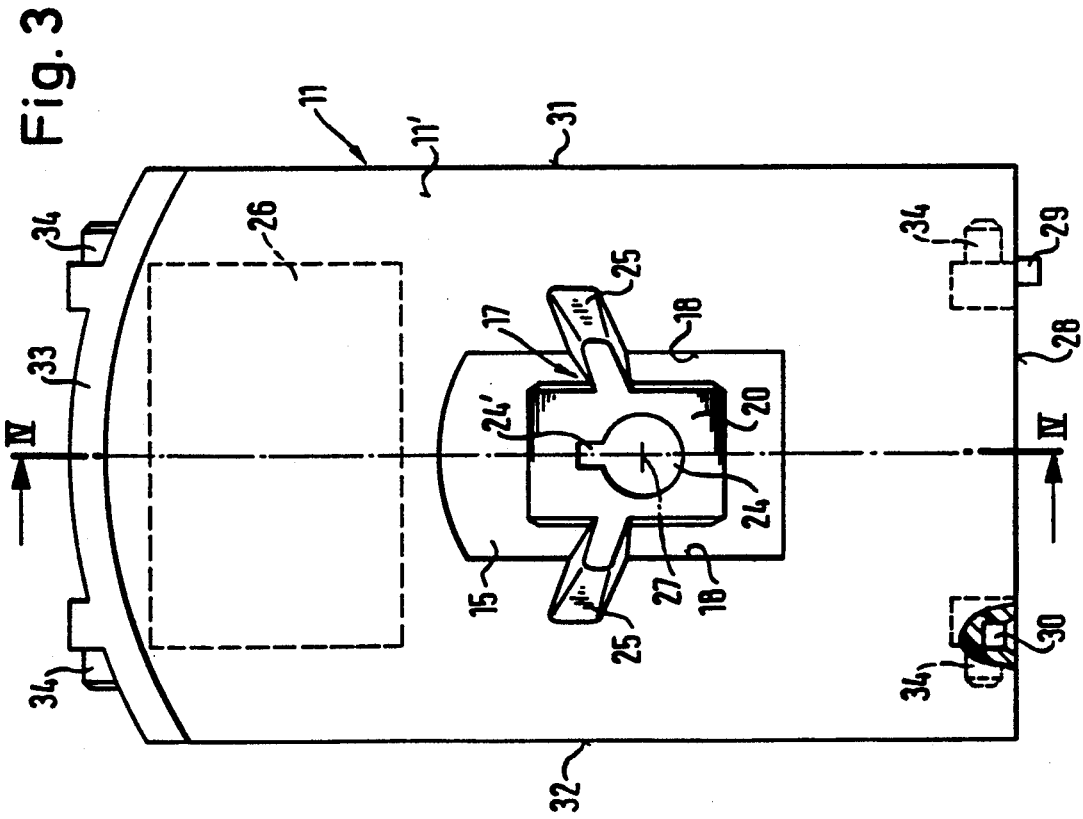

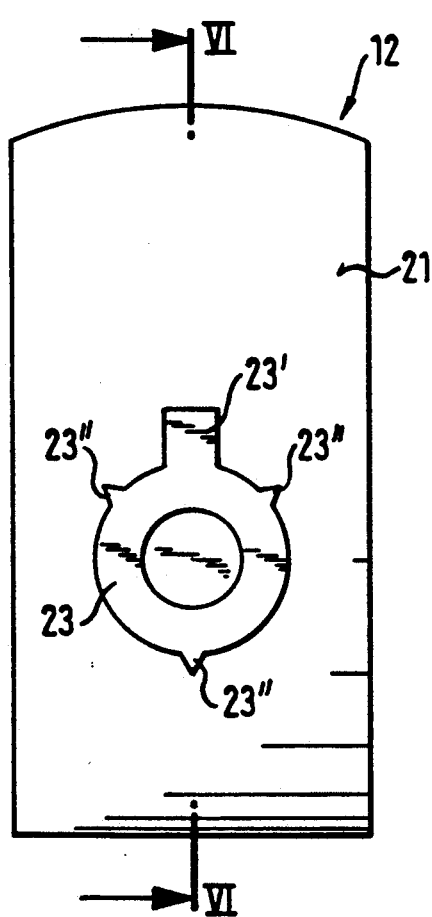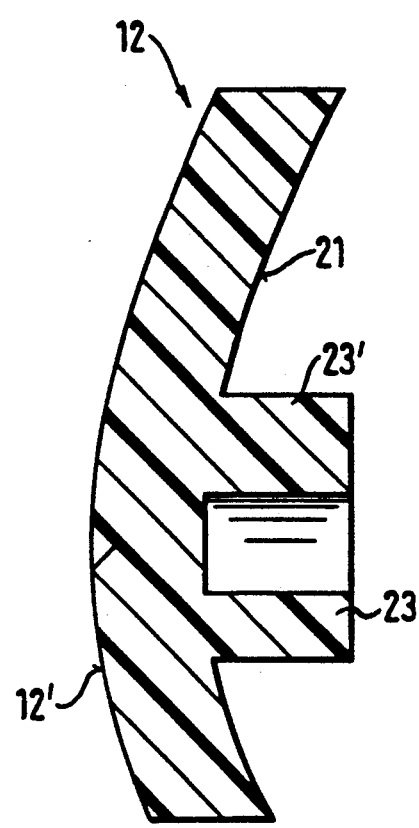

MIRROR COLLIMATOR HAVING A LARGE APERTURE RATIO

The invention relates to a mirror collimator with a larger concave mirror, in particular a parabolic mirror and a smaller capture mirror, in particular a convexly formed capture mirror arranged on the concave side and on the optical axis of the concave mirror, the capture mirror being secured to the concave mirror by at least one carrying device which extends from the concave mirror to the capture mirror, the carrying device comprising at least one and in particular two carrying arms.

Such mirror collimators (EP 0 358 929 A2; U.S. Pat. No. 4,792,685) have the advantage of a particularly large aperture ratio (numerical aperture). In other words a large aperture can be realised in such mirror collimators for a relatively small constructional depth.

The known mirror collimators of this kind, however, have the disadvantage that the operational light must partly pass through transparent bodies and that the assembly and the possibility of integration into an overall system are problematic.

It is already known, in a large optical telescope, to arrange a secondary reflector opposite to a concave mirror via struts, however, all the components must be separately manufactured and assembled (DE-35 27 826 A1).

The object of the present invention lies in providing an improved mirror collimator of the initially named kind.

A further object of the invention lies in providing a mirror collimator of the initially named kind in which, despite cost-favourable manufacturing techniques, an excellent optical quality can be obtained in that a high surface quality and correct shape of the optical components is ensured.

Finally, manufacture and assembly should be possible in a simple and rational manner.

In order to satisfy this object the invention provides that the concave mirror has a throughgoing cut-out in the area in which a photo-element is arranged; that the carrying arms extend from the edge of the cut-out in the concave mirror to the edge of the capture mirror; and that the cut-out has a size such that the capture mirror passes through it.

The mirror collimator of the invention renounces the passage of the operational light through transparent components in that the capture mirror is arranged on the concave mirror via the carrying device of the invention. The carrying device ensures a precise optical alignment of the concave mirror and the capture mirror without the beam path between the concave mirror and capture mirror being substantially impaired. The cut-out in the concave mirror thereby ensures a simple installation opening for the capture mirror and a suitable arrangement of an injection molding tool for the manufacture of the carrying device and of the capture mirror.

The two carrying arms are thereby preferably provided on opposite edges of a cut-out in the concave mirror and should have a comparatively small cross section which is, however, sufficient for a mounting of the capture mirror free of twisting and oscillation, whereas the carrying arms extend laterally close to the edge of the capture mirror, i.e. extend outside of its mirrors surface they also terminate close to the cut-out at the surface of the concave mirror.

Through a suitable shape of the cut-out (rectangular) and of the carrying arms it can be ensured that the carrying arms only impair the useful beam path to a small degree.

It is particularly advantageous when the concave mirror, the capture mirror and the carrying device are formed solely by two injection molded parts which are connectable to one another. In this arrangement the carrying device should advantageously be manufactured with the concave mirror as an injection molded plastic part and the capture mirror should be manufactured as a further injection molded plastic part. During assembly the capture mirror can be installed on the carrying device through the cut-out in the concave mirror.

In accordance with a further preferred embodiment the concave mirror, the capture mirror and the carrying device can, however, also be manufactured as a single injection molded plastic part. For this the cut-out in the concave mirror can also be formed to receive the injection molding tool for the carrying device and the capture mirror.

A further preferred embodiment is characterized in that the concave mirror and/or the capture mirror are formed as plates curved in accordance with the optical function. In this respect the two mirrors can be manufactured in the simplest manner as the injection molded part without the danger existing that the mirrors change their shape or surface to an impermissible degree when temperature fluctuations occur.

For the partial coupling in and/or coupling out of light provision can furthermore be made for the concave mirror to have a partly transparent region, with light expediently partially coupled in and/or in particular coupled out in the partly transparent region. The coupling out of a part of the light can for example be useful for the additional realization of a sighting device.

For the arrangement in a housing and for the assembly of two mirror collimators in accordance with the invention as light transmitter and light receiver, and also for an arrangement of the carrying arms which impairs the beam paths to the least possible degree, it is expedient when the concave mirror and/or the capture mirror and/or the cut-out are of substantially rectangular shape as seen in the direction of the optical axis, with the carrying arms preferably being provided at the long edges of the cut-out and/or with the one edge or one side being of curved shape.

The assembly of two mirror collimators in accordance with the invention into a light transmitter/receiver arrangement which cooperates with a retroreflector provided at the other end of the measurement path is expediently achieved in accordance with the invention such that a mirror collimator in accordance with the invention, which has a photo-element as the light source, is assembled together with a similar light collimator, which has a photo-receiver as the photo-element, into a side by side arrangement directly alongside each other with parallel optical axes. In this respect the two light collimators are in particular placed alongside one another along one rectangular side with their optical axes parallel, preferably along that rectangular side which extends parallel to the connection line of the two carrying arms.

Furthermore it is expedient when the two mirror collimators are placed alongside one another in a mirror image like arrangement.

Finally, in accordance with the invention provision should be made, in accordance with an expedient further development that complementary projections and cut-outs are injection molded at the rectangular sides which are to be placed alongside one another in such a way that on placing the two mirror collimators alongside one another each projection engages into a recess complementary thereto and thereby precisely aligns the two mirror collimators placed alongside one another.

Through the use of a retro-reflector arranged opposite to the arrangement of two such mirror collimators placed alongside one another the light transmitted from the mirror collimator equipped with a light source can be reflected back to the mirror collimator arranged alongside it and equipped with a photo receiver.

The mirror collimator of the invention has the advantage of cost favourable manufacture of the two optical components through very economical plastic injection molding technology. Uniformly thin plate or wall thicknesses of the component make it possible to achieve high accuracy of shape and also small machine standstill times.

The fact that only two reflective surfaces are optically effective is of advantage, in particular when using the mirror collimator of the invention in closed housings.

As a result of the fact that only reflective surfaces are active, plastics with lower transmissivity will also be used for the injection molding process. This signifies for example that parts of substantially higher temperature strength can be manufactured.

The mirror collimator of the invention can be so executed that it represents a shape closed in itself, i.e. no radiation of the operational light takes place other than in the desired direction. The optical part thus has the function of an optical tube. The cut-out at concave mirror serves to receive the transmitter and receiver components.

Through variation of the small preferably convex hyperbolic capture mirror changes of the focal length of the system are possible with relatively small changes of the focal intercepts. In this way a variety of focal lengths can be realised with little effort from the technical tooling viewpoint.

If the rear side of the concave mirror is formed as an equidistant surface then a part of the mirror can also be used as an optically neutral parallel plate. Through the use of dichroic reflex coatings a beam divider function can be imparted to the concave mirror. A possible use is the coupling out of light in the wavelength range visible to the eye in order to supply a possible subsequently connected sighting device (telescopic sight) with light from the beam path.

The invention will now be described in the following by way of example and with reference to the drawings in which are shown:

FIG. 1 a view of an assembled mirror collimator in accordance with the invention in the direction of the optical axis and onto the surface of the concave mirror which is formed as a parabolic mirror, FIG. 2 a side view of the subject of FIG. 1, FIG. 2a a section in accordance with the line IIa—IIa in FIG. 1, with an inbuilt photo-element being additionally shown, FIG. 3 a corresponding view to that of FIG. 1 but of a somewhat different embodiment and prior to assembly with the capture mirror, FIG. 4 a section on the line IV—IV in FIG. 3, FIG. 5 a rear view of the capture mirror of the invention, and FIG. 6 a section on the line IV—IV in FIG. 5.

In accordance with FIGS. 1 and 2 the mirror collimator in accordance with the invention comprises a parabolic mirror (11) which is rectangularly shaped apart from a curved edge (33), a carrying device (17) which projects from its concave mirror surface 11' essentially parallel to the optical axis 27 and a hyperbolically shaped capture mirror 12 with a convex mirror surface 12' arranged on the carrying device 17. The parabolic mirror 11 has two longer edges 31, 32 which extend parallel to one another, a shorter curved edge 33 and a shorter straight edge 28. Securing means 34 for securing the parabolic mirror 11 within a non-illustrated housing on a chassis are provided in the region of the shorter edges 28, 33. In the region of the optical axis 27 the parabolic mirror 11 has a cut-out 15 of similar shape to its outer contour. The longer edges 18 of the cut-out extend parallel to the longer edges 31, 32 of the parabolic mirror 11. The edge 35 of the cut-out 15 which points towards the curved edge 33 of the parabolic mirror 11 is curved in accordance with the edge 33. The short straight edge 36 which lies opposite to the curved edge 35 extends parallel to the short straight edge 28 of the parabolic mirror 11. The geometrical shape of the parabolic mirror 11 is such that its optical axis 27 is located in the region of the lower half of the long rectangular edges 31, 32. Of the central axis 37 of the parabolic mirror 11 approximately two thirds lie on the side of the optical axis 27 adjacent the curved edge 33 whereas one third is located on the side adjacent the short straight edge 28.

In accordance with the FIGS. 1 to 4 carrying arms which are manufactured in one piece with the parabolic mirror 11, and which are preferably jointly injection molded therewith, extend essentially parallel to the optical axis 27 from the straight side edges 18 of the cut-out 15 but are, however, somewhat inwardly inclined towards the cutout 15 in order to receive, at the end of the mirror surface 11', a mounting plate 20 which is injection molded in one piece onto the carrying arms 25 and which is of a smaller area than the cut-out 15. From FIGS. 3 and 4 in particular one can see that a throughgoing circular mounting bore 24 with a lateral keyway-like broadened portion 24' is provided in the mounting plate 20. Into this mounting bore 24 with broadened portion 24' there is inserted, from the side of the mirror surface 11' of the parabolic mirror 11, a fitted spigot 23 which is injection molded in one piece to the rear side of the capture mirror 12 as can be seen from the FIGS. 1, 2 and 5, 6. The fitted spigot 23 has a lateral rib 23' which fits together with the broadened portion 24'. moreover, small clamping ribs 23'' are provided distributed around the fitted spigot 23 which, in accordance with FIG. 1, come into contact with the fitted seat against the inner wall of the mounting bore 24. The fitted spigot 23 carries at its end facing the higher concave surface 11' the hyperbolically shaped capture mirror 12, the mirror surface 12' of which faces the mirror surface 11' of the parabolic mirror 11. Both the parabolic mirror 11 and the capture mirror 12 are formed as plates with surfaces which extend substantially parallel to one another.

In accordance with FIGS. 1 to 4 the mounting plate 20 has, at the side facing the parabolic mirror 11, a convexly curved contact surface 22 which is contacted by complementary concave surface 21 of the capture mirror 12. In this manner the capture mirror 12, which is for example bonded to the mounting plate 20, can be fixed relative to the parabolic mirror 11, correctly adjusted in a trouble-free manner.

In accordance with FIG. 2a a photo-element 16 is secured within the cut-out 15 by means of a mounting device 38 which is only shown in broken lines. The connections 39 of the photo-element 16 project outwardly beyond the imaginary apex 14 of the parabolic mirror 12 while the photo-element 16, which can for example be a photo-diode or photo-receiver, is located at the focal point of the optical system formed by the parabolic mirror 11 and the capture mirror 12. If, in accordance with figure 2a, a parallel light beam 40 is incident parallel to the optical axis 27 on the mirror surface 11' of the parabolic mirror 11 title beams will be deflected inwardly to the convexly curved mirror surface 12' of the capture mirror 12, as a result of a suitable shape of the parabolic mirror surface 11', and will be concentrated by the capture mirror 12 onto the photo-element 16 at the focal point 13. Vice versa a parallel light beam 40 can be transmitted by the capture mirror 12 of the parabolic mirror 11 through use of a photo-diode as the photo-element 16, with the light transmitting surface of the diode being located at the focal point 13.

As can be seen from FIGS. 1 and 3, the carrying arms 25 start from a region directly alongside the long-sided edges 18 of the cut-out 15 and extend up to and somewhat beyond the side edges 19 of the capture mirror 12 where they are connected to the mounting plate 20.

As can be seen from FIG. 1 the capture mirror 12 has, in a view in the direction of the optical axis 27, a similar shape to the parabolic mirror 11 and to the cut-out 15.

In accordance with FIG. 4 a partly transmitting region 26 can be provided at least a part of the parabolic mirror 11 through which a part of the incident radiation 40 passes in order to fall on a lens 41 provided directly behind the parabolic mirror 11. The lens 41 can for example be a component of a sighting device. In the reverse manner a beam could be additionally coupled from the outside into the beam path 40 via the lens 41—if desired.

The substantially larger parabolic mirror 11 thus carries via two integrated carrying arms 25 the mounting plate 20 for the hyperbolically shaped capture mirror 12. The mechanical connection between the capture mirror 12 and the mounting plate 20 can be executed by an adhesive bond. The required centering accuracy is ensured by the spherical shape of contact surfaces 21, 22 and the fitted spigot 23 as well as the mounting bore 24.

The installation of the hyperbolic capture mirror 12 takes place by inserting it through the cut-out 15 from behind along the space between the two carrying arms 25 until the fitted spigot 23 enters into the mounting board 24 and the two contact surfaces 21, 22 are in connection with one another. As the region of the cut-out 15 of the parabolic mirror 11 is optically non-active as a result of the system this cut-out 15 does not lead to any reduction of the efficiency. As a result of the special rectangular shape of the cut-out which results from the drawing it is moreover ensured that the carrying arms 25 do not significantly impair the optical characteristics.

The parabolic mirror 11, the carrying arms 25 and the mounting plate 20 are preferably manufactured in accordance with the invention as a unitary injection molded plastic part (FIG. 3, 4). A second plastic injection molded part is formed by the capture mirror 12 with the fitting spigot 23 arranged thereon (FIG. 5, 6). The overall arrangement can thus be manufactured from two injection molded plastic parts which are adjusted relative to one another in a trouble-free manner after having been assembled without the need for further adjusting measures.

The overall arrangement comprising parabolic mirror 11, carrying device 17 and capture mirror 12 can, however, be manufactured as a single plastic injection molded part, with the cut-out 15 in the parabolic mirror 11 corresponding in form and size approximately to the capture mirror 12 and thus enabling a technical tooling realisation of a unitary injection molded part.

As can be seen from FIGS. 2 and 4, the carrying arms 25 lie somewhat above the optical axis 27 and extend essentially parallel to it. They extend in accordance with FIGS. 1 and 3 somewhat obliquely inwardly in order to carry the mounting plate 20 which has essentially the same width as the capture mirror 12. As can be seen from FIGS. 1 and 2, the capture mirror 12 projects substantially beyond the mounting plate 20 which carries it in the two directions pointing in the direction of the longer edges 19.

Of particular importance is the fact that the carrying arms 25 have the smallest possible cross-section so that the beam path extending between the mirror surfaces 11', 12' is interrupted as little as possible by the carrying arms 25. For this reason the carrying arms 25 are also arranged alongside the longside edges 18 of the cut-out 15. Between these longside edges 18 and the long edges 31, 32 of the parabolic mirror 11 only a smaller mirror surface is in any case available, in comparison to the space between the upper curved edge 35 of the cut-out 15 and the curved edge 33 of the parabolic mirror 11, so that the fraction of the light intercepted by the carrying arms 25 remains small.

In accordance with FIGS. 1, 2, 2a, 3 and 4 the approximately rectangular concave mirror 11 has at the lower narrow rectangular side 28, on both sides of the central axis 37, mutually complementary projections 29 and recesses 30. If two identical mirror collimators of this kind are placed with their rectangular sides 28 alongside one another in a mirror image arrangement then a unit consisting of two mirror collimators is formed of which one can be equipped with a light source and is used as a light transmitter and of which the other can be equipped with a photo-receiver and is used as a light receiver. At a distance from this constructional unit there is located a retro-reflector for the reflection of the light transmitted from the light transmitter back to the light receiver.

We claim:

1. Mirror collimator with a larger concave mirror, and a smaller convexly formed capture mirror arranged on a concave side and on an optical axis of the concave mirror, the capture mirror being secured to the concave mirror by at least one carrying device which extends from the concave mirror to the capture mirror, the carrying device comprising at least one carrying arm, characterized in that the concave mirror has a through-going cut-out in the area of which a photo-element is arranged; the at least one carrying arm extending from the edge of the cut-out in the concave mirror to the edge of the capture mirror; and the cut-out having a size such that the capture mirror passes through it.

2. Mirror collimator in accordance with claim 1, characterized in that a common focal point of the concave mirror and the capture mirror is located in the region of an apex of the concave mirror.

3. Mirror collimator in accordance with claim 1, characterized in that a mounting plate on which the capture mirror is mounted, is connected to the at least one carrying arm.

4. Mirror collimator in accordance with claim 1, characterized in that an end of the at least one carrying arm is fixedly connected to the concave mirror, and the mounting plate is fixedly connected to an other end of the at least one carrying arm.

5. Mirror collimator in accordance with claim 1, characterized in that the mirror, the capture mirror and the carrying device are formed solely by two mutually connectable injection molded plastic parts.

6. Mirror collimator in accordance with claim 1, characterized in that the carrying device and the concave mirror are formed as one injection molded plastic part and the capture mirror is manufactured as a further injection molded plastic part.

7. Mirror collimator in accordance with claim 6, characterized in that the carrying device and the capture mirror have mutually complementary contact surfaces and/or engagement elements which ensure an adjusted position of the capture mirror mounted on the carrying device.

8. Mirror collimator in accordance with claim 7, characterized in that the carrying device has a curved contact surface corresponding to the surface curvature of a rear side of the capture mirror.

9. Mirror collimator in accordance with claim 7, characterized in that the carrying device has a mounting bore in which a fitted spigot provided at a far side of the capture mirror engages in a fitted seat.

10. Mirror collimator in accordance with claim 9, characterized in that the fitting spigot and the mounting bore are non-round and also ensure a problem-free relative angular position of the concave mirror and the capture mirror.

11. Mirror collimator in accordance with claim 1, characterized in that the concave mirror, the capture mirror and the carrying device are manufactured as a single injection molded plastic part.

12. Mirror collimator in accordance with claim 11, characterized in that the cut-out in the concave mirror is formed to receive an injection molding tool for the carrying device and the capture mirror.

13. Mirror collimator in accordance with claim 1, characterized in that the concave mirror and/or the capture mirror are formed as plates curved in accordance with an optical function.

14. Mirror collimator in accordance with claim 13, characterized in that the plates have thicknesses which are at least approximately constant over the optically active surfaces so that the two surfaces of each plate extend at least approximately parallel to one another.

15. Mirror collimator in accordance with claim 1, characterized in that the concave mirror has a partly transparent region.

16. Mirror collimator in accordance with claim 15, characterized in that light is partly coupled in the partially transmitting region.

17. Mirror collimator in accordance with claim 1, characterized in that the concave mirror and/or the capture mirror and/or the cut-out are of essentially rectangular shape as seen in the direction of the optical axis, with the at least one carrying arm preferably being provided at long edges of the cut-out, and/or in that one edge or an other edge can be of curved shape.

18. Mirror collimator in accordance with claim 1, which has a photo-element as a light source, characterized in that the mirror collimator is assembled together with a further light collimator in accordance with the preceding claims and having a photo-receiver as the photo-element, in a directly side-by-side arrangement with parallel optical axes.

19. Mirror collimator in accordance with claim 17, characterized in that the two light collimators are placed alongside one another with parallel optical axes along one rectangular side.

20. Mirror collimator in accordance with claim 18, characterized in that the mirror collimators and the further mirror collimator are placed alongside one another in a mirror image arrangement.

21. Mirror collimator in accordance with claim 18, characterized in that the complementary projections and cut-outs are injection molded at the rectangular sides which are to be placed alongside one another in such a way that on placing the mirror collimator and the further mirror collimator alongside one another in each case one projection engages into a recess complementary thereto and thereby precisely aligns the mirror collimator and further mirror collimator placed alongside one another.

* * * * *